Oct. 27, 1970   F. V. PLIML, JR   3,535,933
LIQUID LEVEL INDICATOR
Filed Feb. 17, 1969
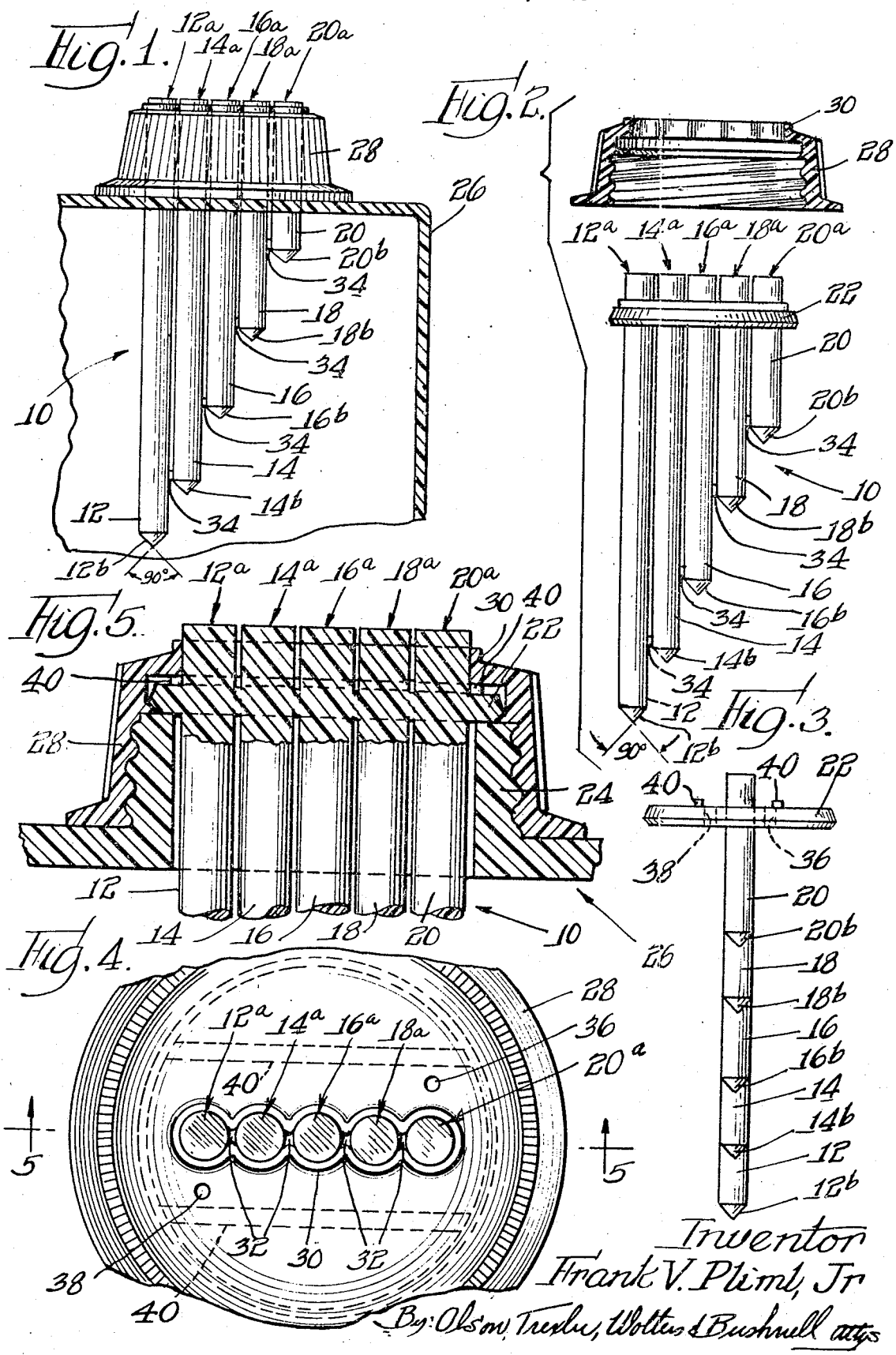
Inventor
Frank V. Pliml, Jr
By: Olson, Trexler, Wolters & Bushnell attys

United States Patent Office 3,535,933
Patented Oct. 27, 1970

3,535,933
LIQUID LEVEL INDICATOR
Frank V. Pliml, Jr. Cicero, Ill., assignor to Illinois Tool Works Inc., Chicago, Ill., a corporation of Delaware
Filed Feb. 17, 1969, Ser. No. 799,652
Int. Cl. G01f 23/02
U.S. Cl. 73—327
7 Claims

ABSTRACT OF THE DISCLOSURE

A liquid level indicator in which a plurality of depending parallel light transmitting rods having different lengths are adjacently positioned, but maintained physically separated substantially throughout the entire longitudinal extent thereof. The upper portions of each of the light rods are interconnected and spaced apart by a flange section which in turn is clamped to the liquid container. The lower portions of the rods are integrally connected by a separator element between the rods and the upper portions provided an exposed liquid level indicating surface. The lower extremities of the light rods are positioned in the liquid and define a conical tip having an included angle of 90° for receiving light rays from and reflecting light rays to the upper indicating surface.

---

Liquid level indicators comprising elongate members in the form of rods of light transmitting material have heretofore been used for the purpose of indicating the level of liquid within a container. The lower extremities of such rods have been produced with a conical tip for receiving light from and reflecting light to the upper exposed surface of the rod. To obtain the most efficient reflection of light rays from the aforesaid conical tips, the indicator rod should be free from peripheral interference which may diminish the reflective efficiency of the above-mentioned conical tips.

It is therefor an important object of the present invention to provide an improved liquid level indicator of the above-mentioned type employing a plurality of elongate members or rods which are so constructed and arranged as to assure enhancement of the light reflective characteristics thereof.

More specifically, the present invention is concerned with the provision of a liquid level indicator of the type referred to above in which the rods, although adjacently positioned, are in fact physically separated throughout substantially their entire longitudinal extent so as to increase the intensity of light reflected to a liquid level indicating surface.

It is a further object of the present invention to provide a very practical, yet simple, one-piece liquid level indicator of the type referred to above which may be conveniently mounted on the upper wall of a liquid container.

A further object of the present invention is to provide a liquid level indicator comprised of a plurality of elongate members of rods as set forth above, which may be produced by the practice of conventional plastic molding methods.

The foregoing and other objects and advantages will be more apparent from the following detailed description when considered in connection with the accompanying drawings, wherein:

FIG. 1 discloses in elevation a liquid level indicator of the type contemplated hereby, in association with the upper wall of a liquid container, as for example a gasoline tank;

FIG. 2 is an exploded view of the liquid level indicator detached from its supporting cap, said cap being shown in vertical cross-section;

FIG. 3 is an elevational view of the liquid level indicator as seen from the right of FIG. 2;

FIG. 4 is an enlarged plan view of the indicator and supporting cap or closure member therefor as viewed from the top of FIG. 1; and FIG. 5 is a transverse fragmentary vertical sectional view taken substantially along the line 5—5 of FIG. 4, portions of the elongate indicator members or rods being shown in elevation.

Referring now to the drawing more in detail, wherein like numerals have been employed to designate similar parts throughout the various figures, it will be seen that one embodiment of the improved liquid level indicator of the type contemplated by the present invention is designated generally by the numeral 10. The device 10 is formed of suitable light transmitting material and comprises a plurality of elongate light transmitting members or rods 12, 14, 15, 18 and 20. Each of these elongate members or rods are provided at their upper extremities with light receiving level indicating surfaces 12a, 14a, 16a, 18a and 20a respectively. The upper extremities of the elongate members are preferably formed integral with a flange section 22 adapted to be secured or clamped against the upper surface of a threaded neck 24 of a container 26 through the agency of a suitable manually rotatable threaded cap or closure member 28.

Formed integral with the cap 28 is an unwardly extending flange 30. The inner surface of the flange 30 provides a series of arcuate wall portions which accommodate the elongate members or rods 12a to 20a, inclusive. It will be noted that these arcuate walls do not fully encompass each of the elongate members by reason of gaps 32 (FIG. 4). The flange 22 and the upper wall of the closure member 28 may be provided with vents 36, 38 to permit escape of gases when the indicator is used in association with such containers as gasoline tanks and the like. The vents may be formed during the molding of the indicator. Longitudinal ribs or protuberances 40 are employed to assure the presence of a space into which gases from the vents 36 and 38 may pass before escaping through the gaps 32.

From the foregoing it will be apparent that with the exception of separators 34 of extremely limited axial extent, located in the vicinity of and extending between the lower extremities of adjacent rods, these members are adjacently separated throughout substantially their entire longitudinal extent. The lower extremities of the rods 12, 14, 16, 18 and 20 are provided with light receiving and reflecting surface means in the form of conical tips 12b, 14b, 16b, 18b and 20b, respectively, each of said conical tips having an included angle of 90°. Light received by the exposed upper liquid level indicating surfaces 12a, 14a, 16a, 18a and 20a is directed downwardly to the conical surfaces or tips at the lower extremities of each of the aforesaid rods and is reflected upwardly by said conical tip to the level indicating surfaces, providing the level of the liquid within the container 26 is below said conical tips. As the level of the liquid rises within the container, the conical tips become successively immersed within the liquid and hence the upper level indicating surface complementary to such immersed tips will darken. Thus the level of the liquid within the container may be determined visually by observing the dark and light characteristic of the surfaces 12a, 14a, 16a, 18a and 20a.

It is of significant impartance that the rods be maintained physically separated throughout substantially their entire longitudinal extent. With this construction the efficiency of the refractive capabilities of the conical tips is materially enhanced. In fact, by employing this arrangement, it is possible to observe light rays reflected to the upper level indicating surfaces by viewing each surfaces from the side of the closure member 28 as well as from the top. It will be noted that all of the upper extremities of the rods project slightly above the flange 22. By having the rods adjacently separated as above described, the light rays reflected to the upper level indicating surfaces 12a, 14a, 16a, 18a and 20a is materially intensified. In other words, substantially all of the light rays received by the upper surfaces of the rods are reflected to said surfaces when the lower tips are positioned above the liquid level. If separation of the rods throughout substantially their entire longitudinal extent is not provided the desired reflection of light rays to the upper indicating surfaces may be materially impaired. It will be noted that while the rods and mounting flange therefor may be molded in one piece, peripheral separation of the rods is maintained throughout substantially their entire axial extent. Indicator rods, if not separated, as previously set forth, would permit stray reflective rays to pass into the body of adjacent rods, thereby causing confusion in readout of the preper liquid level.

It will also be apparent from the foregoing description that a liquid level indicator of the type contemplated hereby greatly enhances the ease with which the shaded or unshaded condition of the upper level indicating surfaces may be observed.

The invention is claimed as follows:

1. A unitary level indicator for indicating levels of liquid subject to fluctuation within a container, comprising a plurality of elongated members of light transmitting material adjacently separated throughout the entire longitudinal extent thereof, each member including a lower portion immersible within liquid and an upper portion providing an exposed liquid level indicating surface, container mounting means integral with the upper portion of said elongated members including means to interconnect the upper portions in a spaced relationship for limited axial extent and also forming annular flange means projecting radially outwardly of the elongated members, said flange means adapted to be associated with complementary mounting means in an associated container, light reflecting surface means forming part of the lower extremity of each elongated member and angularly disposed with respect to a complementary level indicating surface for receiving light rays from and reflecting light rays to said complementary level indicating surface, said light reflecting surface means having an included angle of 90° and so disposed with respect to said upper level indicating surface as to receive and reflect light on only the portion of said light reflecting surface means located above the level of an associated body of liquid, said light reflecting surface means progressively varying in axial distance from said level indicating surface, connecting means integral with said elongated members, said connecting means being of sufficient limited axial extent to reduce the light transferred from one member to another, said connecting means located adjacent the lower extremities of said elongated members, wherein the efficiency of the reflection of light within each elongated member is enhanced.

2. A level indicator for indicating levels of liquid subject to fluctuation within a container as set forth in claim 1 wherein container closure means is provided for securing the container mounting means in proper position upon the upper wall of a container.

3. A level indicator for indicating levels of liquid subject to fluctuation within a container as set forth in claim 1 wherein the container mounting means includes flange means extending radially outwardly from the elongate members for accommodating the clamping side of a rotary closure member.

4. A level indicator for indicating levels of liquid subject to fluctuation within a container as set forth in claim 1 wherein a closure means is provided which is apertured to telescopically accommodate the upper extremities of said elongated members, with said upper extremities projecting beyond the upper limit of the closure member.

5. A level indicator for indicating levels of liquid subject to fluctuation within a container as set forth in claim 1 wherein a closure member is provided for accommodating the container mounting means for clamping said mounting means in proper position upon a container, the upper wall of said closure member provided with a series of apertures defied by undulated flange means for accommodating the upper extremities of the elongate members.

6. A level indicator for indicating levels of liquid subject to fluctuation within a container as set forth in claim 1 wherein vent means is provided in association with said container mounting means.

7. A level indicator for indicating levels of liquid subject to fluctuation within a container as set forth in claim 6 wherein longitudinal ribs are formed on the flange to assure the presence of space into which gases from the vents may pass.

References Cited

UNITED STATES PATENTS

| 2,123,479 | 7/1938 | Spencer | 73—327 |
| 3,383,917 | 5/1968 | Ryder et al. | 73—327 |
| 3,442,127 | 5/1969 | Nichols | 73—327 |
| 3,141,094 | 7/1964 | Strickler. | |

FOREIGN PATENTS

| 412,803 | 7/1934 | Great Britain. |
| 626,576 | 7/1949 | Great Britain. |

LOUIS R. PRINCE, Primary Examiner

D. M. YASICH, Assistant Examiner

U.S. Cl. X.R.

136—182